United States Patent [19]

Jordan et al.

[11] Patent Number: 5,649,732

[45] Date of Patent: Jul. 22, 1997

[54] RAMP AND RAMP SUPPORT ATTACHABLE TO A TRAILER HITCH RECEIVER

[76] Inventors: Gary Wayne Jordan, Rte. 1 Box 355½; Gary Wayne Jordan, Jr., Rte. 4, Box 205B, both of Charleston, W. Va. 25312; William Carter Jordan, HC70 Box 105 Blundon Rt., Elkview, W. Va. 25071

[21] Appl. No.: 649,497

[22] Filed: May 17, 1996

[51] Int. Cl.⁶ ............................................. B62D 33/03
[52] U.S. Cl. ............................. 296/26; 296/61; 414/537
[58] Field of Search ......................... 296/26, 57.1, 61; 414/537; 224/521, 405, 510

[56] References Cited

U.S. PATENT DOCUMENTS

| | | |
|---|---|---|
| 3,763,827 | 10/1973 | Burkart . |
| 3,777,921 | 12/1973 | Nelson . |
| 4,900,217 | 2/1990 | Nelson . |
| 4,913,615 | 4/1990 | Ward . |
| 4,934,894 | 6/1990 | White .......................... 414/537 X |
| 4,990,049 | 2/1991 | Hargrove . |
| 5,211,437 | 5/1993 | Gerulf . |
| 5,380,145 | 1/1995 | Czaplewski . |
| 5,451,088 | 9/1995 | Broad .............................. 296/26 |
| 5,458,389 | 10/1995 | Young ............................ 296/26 |
| 5,462,398 | 10/1995 | Hymer ........................ 414/537 X |
| 5,476,202 | 12/1995 | Lipp . |
| 5,538,308 | 7/1996 | Floe .............................. 296/61 |

FOREIGN PATENT DOCUMENTS

| | | |
|---|---|---|
| 33 26 027 A1 | 1/1985 | Germany . |
| 370353 | 4/1932 | United Kingdom . |
| WO89/06199 | 7/1989 | WIPO . |

*Primary Examiner*—Joseph D. Pape
*Attorney, Agent, or Firm*—Richard C. Litman

[57] ABSTRACT

A ramp system for loading or unloading trucks, vans, or other vehicles which are equipped with a trailer hitch receiver. The ramp system of the present invention includes a ramp support, one or more ladder-like ramps, and a corresponding number of ladder-like bridging pieces. The ramp support includes a L-shaped support frame which attaches to the trailer hitch receiver, and supports a horizontal ramp support bar at about the height of the cargo bed of the vehicle. One end of each ladder-like ramp has rings which fit around the horizontal ramp support bar. The other end of each ramp is rested on the ground, thus providing an inclined ramp for moving loads on to or off of the cargo bed of the vehicle. One end of each bridging piece hooks to the horizontal support bar while the other end rests on the cargo bed of the vehicle.

15 Claims, 4 Drawing Sheets

RAMP AND RAMP SUPPORT ATTACHABLE TO A TRAILER HITCH RECEIVER

BACKGROUND OF THE INVENTION

1. Field of the Invention

The present invention relates to a ramp system for loading and unloading of a pickup truck. More particularly, the present invention is a ramp system including a ramp support which mounts to a trailer hitch receiver.

2. Description of the Prior Art

Off-road vehicles such as all terrain vehicles (ATV's) and motocross motorcycles (motocrossers), often cannot be legally driven on the roads because they lack certain safety equipment such as turn signals, rear view mirrors, etc. ATV's and motocrossers are ridden on special cross-country courses that include hill climbs, jumps, and other obstacles that test the rider's skill. Because the ATV's and motocrossers are not street legal, they are most commonly transported to the recreational areas by a pickup truck.

Loading and unloading the ATV's and motorcycles, on to and off of the bed of the pickup truck, is usually achieved by using one or more wooden boards as ramps. One end of each board is placed on the ground and the other end is placed on the open tailgate of the truck, thus forming an inclined ramp extending between the ground and the bed of the truck. The ATV or motorcycle is then pushed up the ramps or ramp in order to load the ATV or motorcycle on to the truck bed, or the ATV or motorcycle is allowed to roll down the ramps or ramp in order to unload the ATV or motorcycle from the truck bed. This procedure is extremely hazardous because should the wooden boards slip, the ATV or motorcycle would fall to the ground, damaging the ATV or motorcycle and very likely causing injury to the person moving the ATV or motorcycle.

For the above reasons, ramps which securely attach to the bed of a pickup truck have been proposed in the prior art. However, none of the prior art ramps achieve the stability and safety of the present invention, without putting some strain on the tailgate or requiring modification of the tailgate.

U.S. Pat. No. 3,763,827, issued to Edward J. Burkart on Oct. 9, 1973, shows a loading chute for loading livestock on to a truck. Burkart does not show a ramp support attachable to the trailer hitch receiver of a vehicle.

U.S. Pat. No. 3,777,921, issued to Bernard J. Nelson on Dec. 11, 1973, shows a rack for carrying a snowmobile on the back of a vehicle. The rear of the rack is supported by a pair of L-shaped frames that attach via special adapters to the frame of the vehicle. Nelson '921 does not show the unique structure of the ramp support of the present invention. Further, Nelson '921 does not show a ramp support attachable to the trailer hitch receiver of a vehicle.

U.S. Pat. No. 4,900,217, issued to Jon N. Nelson on Feb. 13, 1990, shows a ramp for use with a pickup truck. The ramp is stored under a raised platform that fits on the bottom of the truck bed. Nelson '217 does not show a ramp support attachable to the trailer hitch receiver of a vehicle.

U.S. Pat. No. 4,913,615, issued to Harold Ward on Apr. 3, 1990, shows a hinged ramp for use with a pickup truck. The ramp is supported by the tailgate of the truck. Ward does not show a ramp support attachable to the trailer hitch receiver of a vehicle.

U.S. Pat. No. 4,990,049, issued to James F. Hargrove on Feb. 5, 1991, shows a ramp for use with a pickup truck. The ramp is stored under a raised platform that fits on the bottom of the truck bed. Hargrove does not show a ramp support attachable to the trailer hitch receiver of a vehicle.

U.S. Pat. No. 5,211,437, issued to Dennis R. Gerulf on May 18, 1993, shows a combination ramp and tailgate for use with a pickup truck. Gerulf does not show a ramp support attachable to the trailer hitch receiver of a vehicle.

U.S. Pat. No. 5,380,145, issued to Alfred Czaplewski on Jan. 10, 1995, shows an adjustable width ramp that is supported by the rear bumper of a truck. Czaplewski does not show a ramp support attachable to the trailer hitch receiver of a vehicle.

U.S. Pat. No. 5,476,202, issued to Dale J. Lipp on Dec. 19, 1995, shows a bicycle rack that attaches to the trailer hitch receiver of a vehicle. Lipp does not show a ramp support having a height adjustable horizontal ramp support bar.

United Kingdom Patent Document Number 370,353, by John Alexander Flewitt dated Apr. 7, 1932, shows a ramp for moving wheel chairs into or out of vehicles. Flewitt does not show a ramp support attachable to the trailer hitch receiver of a vehicle.

German Patent Document Number 33 26 027 A1, by Karl-Heinz Hensel dated Jan. 31, 1985, shows a two piece ramp where the pieces hook together along the centerline of the ramp. Hensel does not show a ramp support attachable to the trailer hitch receiver of a vehicle.

International (PCT) Application Number WO 89/06199, by Woldemar Reinhold Petri et al. published Jul. 13, 1989, shows a folding ramp for use on a pickup truck. Petri et al. do not show a ramp support attachable to the trailer hitch receiver of a vehicle.

None of the above inventions and patents, taken either singly or in combination, is seen to describe the instant invention as claimed.

SUMMARY OF THE INVENTION

The present invention is directed to a ramp system for loading or unloading trucks, vans, or other vehicles which are equipped with a trailer hitch receiver. The ramp system of the present invention is particularly suited for loading or unloading ATV's, motorcycles, small tractors, etc., into or out of trucks, vans, or other vehicles. The ramp system of the present invention includes a ramp support, one or more ladder-like ramps, and a corresponding number of ladder-like bridging pieces. The ramp support includes an L-shaped support frame which attaches to the trailer hitch receiver, and supports a horizontal ramp support bar at about the height of the cargo bed of the vehicle. One end of each ladder-like ramp has rings which fit around the horizontal ramp support bar, thereby preventing the ramps from slipping. The other end of each ramp is rested on the ground, thus providing an inclined ramp for moving loads on to or off of the cargo bed of the vehicle. One end of each bridging piece hooks to the horizontal support bar while the other end rests on the cargo bed of the vehicle, thus facilitating movement of the load between the horizontal support bar and the cargo bed of the vehicle.

Accordingly, it is a principal object of the invention to provide a safe and secure ramp for loading or unloading a truck bed.

It is another object of the invention to provide a safe and secure ramp for a truck bed, that does not strain the tailgate of the truck.

It is a further object of the invention to provide a safe and secure ramp for a truck bed, that can be installed without modification to the tailgate of the truck.

Still another object of the invention is to provide a safe and secure ramp for a truck bed, that is supported by a ramp support which is securable to the trailer hitch receiver of the truck.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Referring to FIGS. 1–4, the present invention is a ramp system for loading and unloading a vehicle having a cargo area and being equipped with a trailer hitch receiver. In the illustrations the ramp system of the present invention is applied to loading or unloading an ATV on to or off of the bed of a pickup truck. The particular application shown in the illustrations is intended as an example only, and it is by no means intended to limit the scope of the present invention.

The ramp system of the present invention includes a ramp support 10 which is securable to the trailer hitch receiver 12. In addition, the ramp system of the present invention includes a pair of ramps 14 engageable with the ramp support 10, and a pair of bridging pieces 16.

Figure 2:
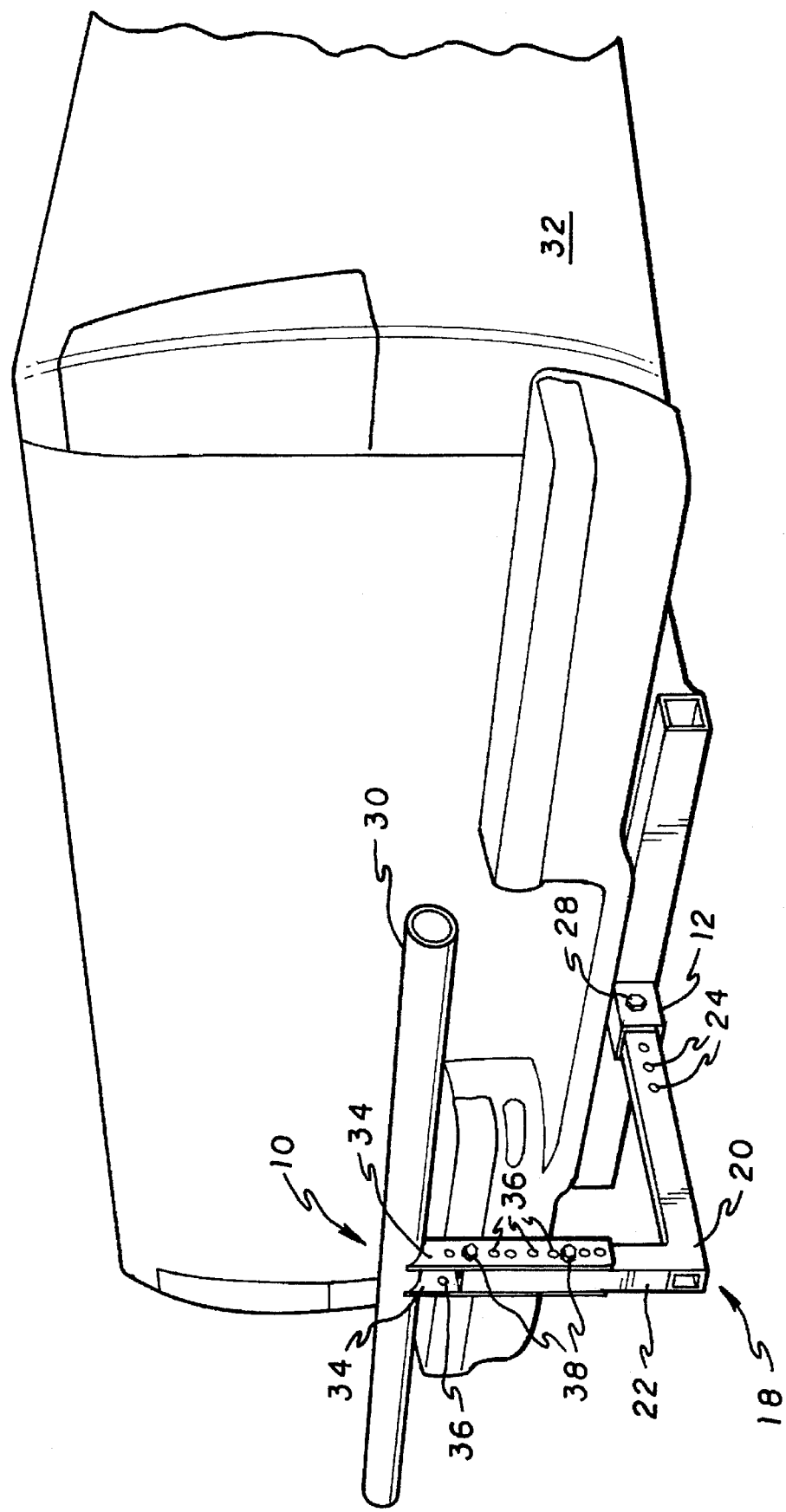
FIG. 2 is an environmental view showing the ramp support installed in the trailer hitch receiver of a pickup truck.
Figure 3:
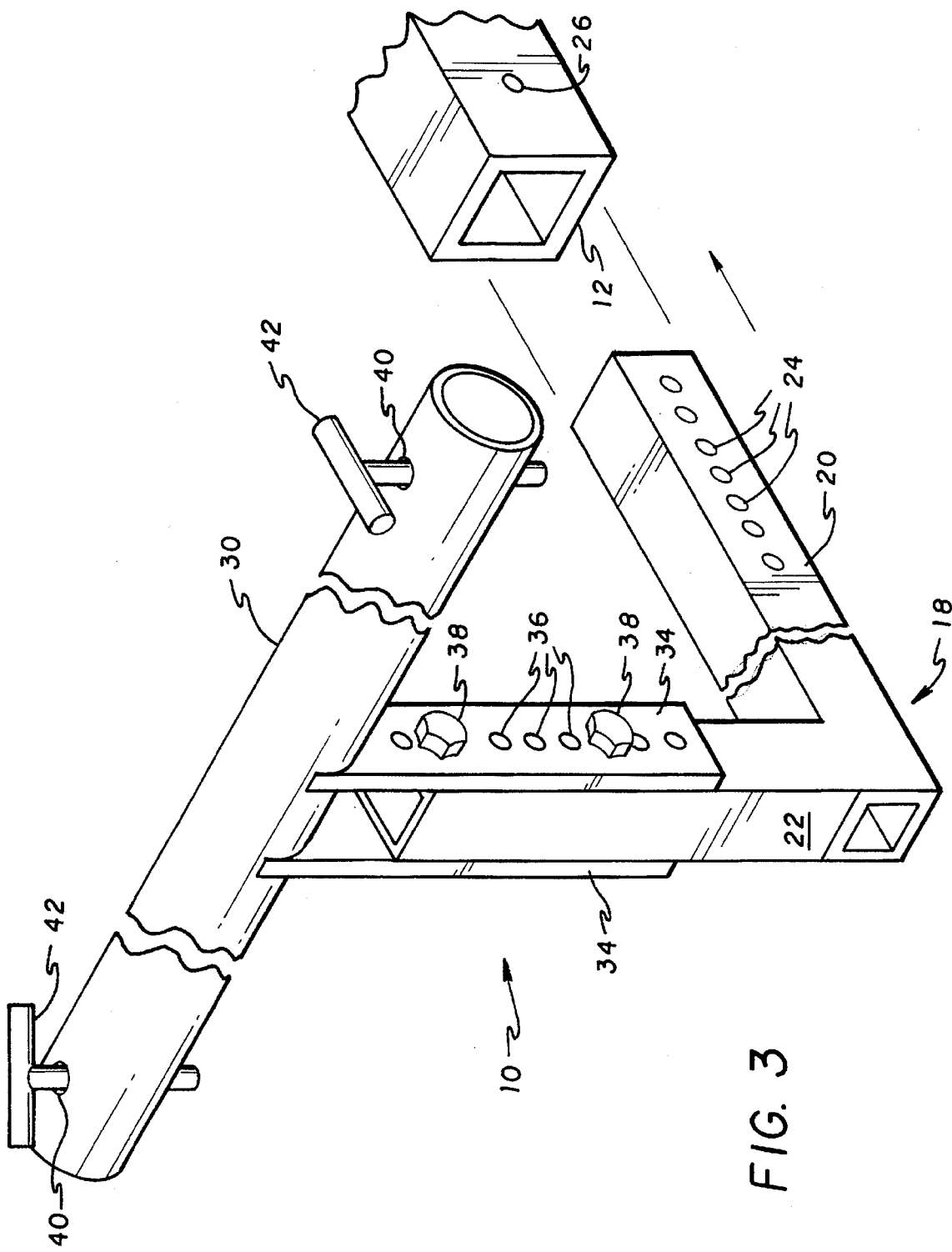
FIG. 3 is a fragmentary view showing details of the ramp support and the trailer hitch receiver.

Referring to FIGS. 2 and 3, the ramp support 10 includes a generally L-shaped support frame 18. The frame 18 includes a first member 20 which has a first end dimensioned and configured to be receivable within the trailer hitch receiver 12. The second end of the first member 20 is attached to the first end of a second member 22. The second member 22 is attached to the first member 20 at a right angle thereby forming the L-shaped frame 18.

The first and second members 20 and 22 are made of square cross section tubing, and are welded together. Near the end of the member 22 which is distal from the joint between the members 20 and 22, a pair of through holes (not shown) are provided. The function of these through holes will become apparent later. Beginning proximate the end of the member 20 which is inserted into the trailer hitch receiver, and evenly spaced along the length of the member 20, are provided a plurality of holes 24. Once the member 20 is inserted into the trailer hitch receiver 12, one of the holes 24 is aligned with the hole 26 of the trailer hitch receiver 12. A bolt 28 is then driven through the hole 26 and the selected hole 24, and secured in place by a nut (not shown). Thus, the ramp support 10 is secured to the trailer hitch receiver 12. The L-shaped frame 18 supports a horizontal ramp support bar 30. By providing a plurality of holes 24 the horizontal position of the ramp support bar 30, relative to the bed of the truck 32, can be adjusted.

The horizontal ramp support bar 30 has a pair of flat, essentially rectangular bars 34 extending from about the middle thereof. Each of the bars 34 has a plurality of holes 36 provided therein. The plurality of holes 36 in one bar 34 are in alignment with the plurality of holes 36 in the other bar 34. The bars 34 are spaced apart for a distance sufficient to allow the member 22 to fit therebetween. The member 22 is positioned between the bars 34 such that the pair of through holes (mentioned previously) in member 22 are in alignment with a selected pair of holes 36 in both bars 34. A pair of bolts 38 are then passed through the selected holes 36 and the through holes in member 22, to fix the bar 30 to the L-shaped frame 18. As with the bolt 28, nuts (not shown) are used to secure bolts 38 in place. Thus, the bar 30 is secured to L-shaped frame 18. The plurality of holes 36 allow the vertical height of the bar 30, relative to the member 20 to be selected by the user.

Preferably the ramp support bar 30 is made of cylindrical tubing. At each end of the bar 30 is a retaining pin hole 40. The holes 40 receive retaining pins 42 which have T-shaped handles for easy insertion and removal. The pins 42 are provided as a safety measure to prevent the ramps 14 from accidentally sliding off the bar 30.

Figure 1:
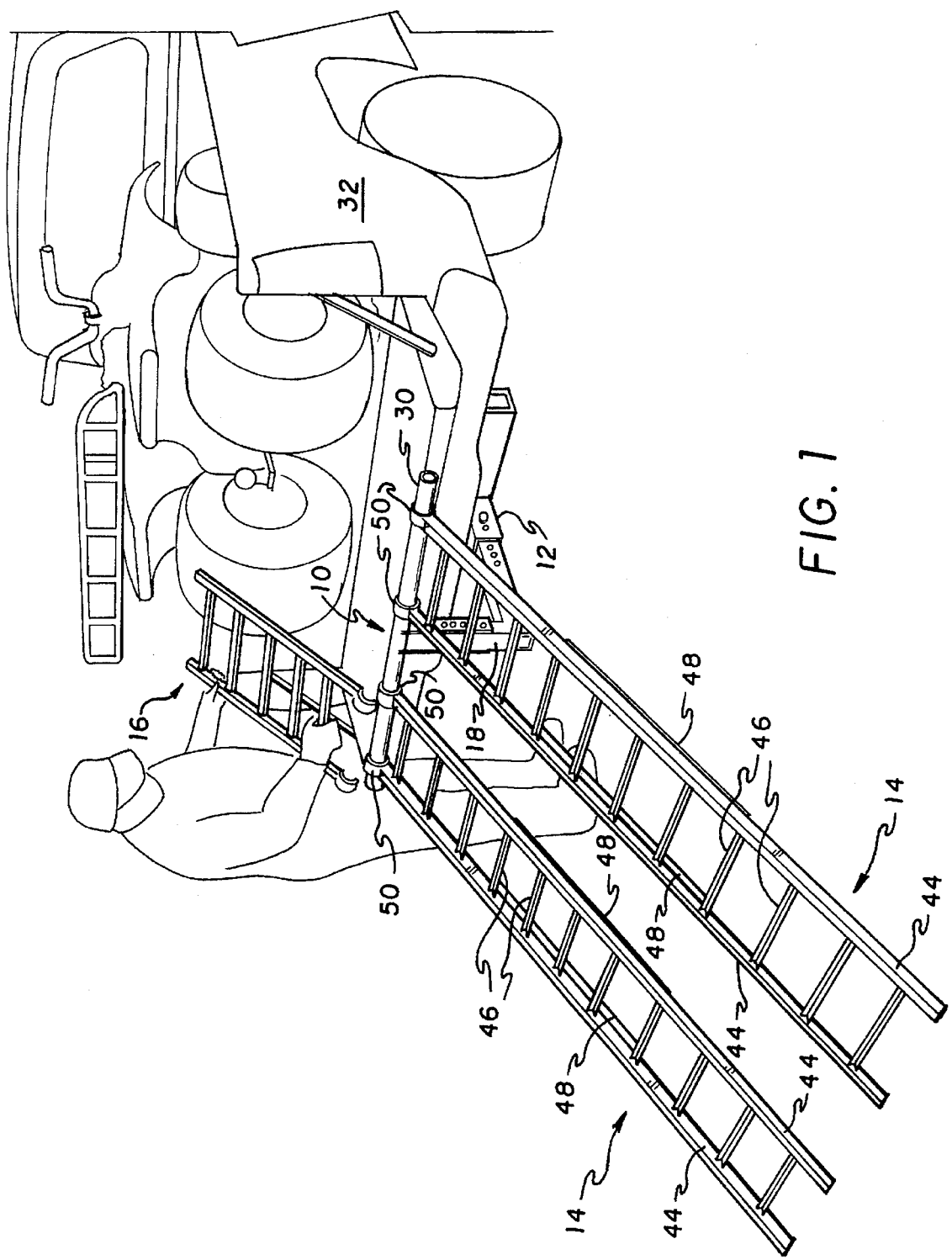
FIG. 1 is an environmental view showing the ramp system of the present invention being installed on a pickup truck.
Figure 4:
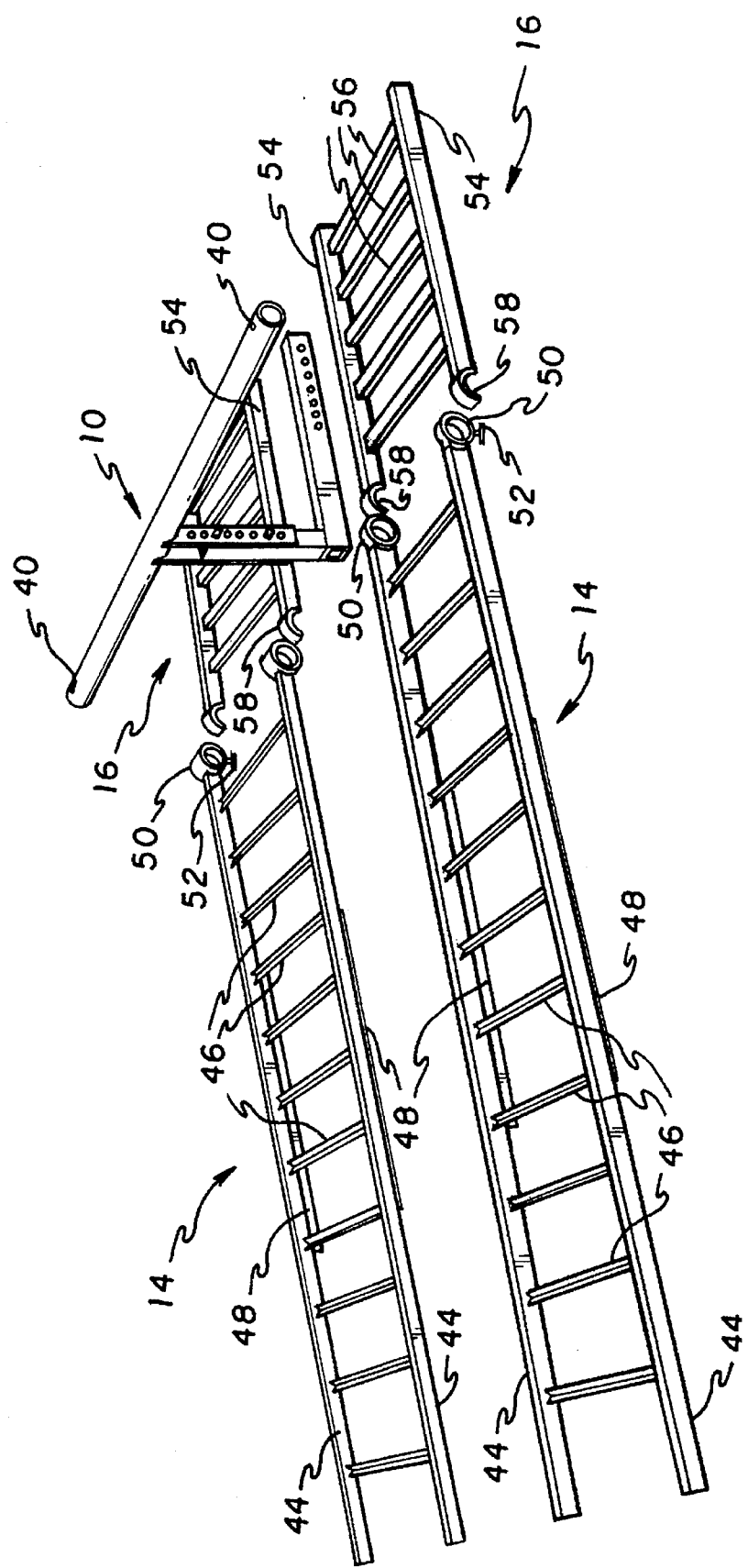
FIG. 4 is a perspective view showing all the components of the ramp system of the present invention.

Referring to FIGS. 1 and 4, each ramp 14 is generally in the form of a ladder, having a pair of elongated lateral beams 44 and a plurality of rungs 46 extending perpendicularly between the beams 44. Each rung 46 has two flat elongated portions that come together at an angle along their lengths to form an apical ridge. Thus, the rungs 46 will have a "V" or "L" shaped cross section with a convex side and a concave side. Each of the rungs 46 is positioned such that its apical ridge faces toward the bottom side of the ramp. Therefore, the concave side of each rung 46 will face toward the top side of the ramp 14 over which loads are moved. This particular geometry for the rungs 46 gives more strength and rigidity to the rungs 46, while providing for better traction when the ramps 14 are being used for loading and unloading ATV's, motorcycles, lawn tractors, etc.

On the bottom of each beam 44, is a stiffening rib 48. The stiffening ribs 48 are made of lengths of angle iron which have two flat portions joined at a right angle along their lengths. Each piece of angle iron is welded to the respective beam 44 with one of its flat portions placed flat against the bottom of the respective beam 44. Thus, the other flat portion of the angle iron is left projecting perpendicularly from the bottom of the respective beam 44. The projecting flat portion of the angle iron acts as the stiffening rib 48 which adds to the strength and rigidity of the respective beam 44.

At one end of each beam 44 is a ring 50. The rings 50 fit around the bar 30 to securely hold the ramps 14 to the bar 30. At least one ring 50 of each ramp 14 has a threaded hole (not shown). A screw 52 (see FIG. 4) engages each threaded hole in the rings 50. When tightened the screws 52 frictionally engage the ramp support bar 30, thereby preventing any slippage between the ramps 14 and the ramp support bar 30 during loading and unloading operations.

Referring to FIG. 4, each of the bridging pieces 16 includes a pair of parallel lateral members 54 having a plurality of rungs 56 extending perpendicularly therebetween. A semi-circular bracket 58 is provided at one end of each of the lateral members 54. The semi-circular brackets 58 fit on the ramp support bar 30 and, in view of the almost horizontal orientation of the bridging pieces 16, keep the bridging pieces 16 from sliding off of the ramp support bar 30 during loading and unloading of the truck 32. The distance between the lateral members of each bridging piece 16, is greater than the distance between the beams 44 of each ramp 14 so that the semi-circular brackets 58 fit on the outside of the respective pair of rings 50.

In use, the ramp support 10 is first installed in the trailer hitch receiver 12. The hole 24 is selected so that the bar 30 is sufficiently far from the trailer hitch receiver 12, so that the bar 30 will not interfere with the opening of the tailgate of the truck 32. The height of the bar 30 is then adjusted so that the bar 30 is slightly above the bottom of the bed of the truck 32.

Each of the ramps 14 is mounted to the ramp support bar 30 on either side of the vertical member 22 of the ramp support 10. Each ramp 14 is mounted to the bar 30 by first positioning the ramp such that the rings 50 are in alignment with the bar 30 at a respective end of the bar 30, and then moving the ramp horizontally until both rings 50 are positioned around the bar 30 and have cleared the retaining pin holes 40. The end of the ramps 14, distal from the rings 50, are then allowed to swing down until they come to rest on the ground. The ramps 14 thus form an inclined path between the ground and the ramp support bar 30.

The distance between the ramps 14 is then adjusted until the distance between the ramps 14 matches the distance between the wheels of the ATV, measured along the axle of the wheels. Screws 52 are then tightened to fix the ramps 14 in place, and the retaining pins 42 are inserted in the retaining pin holes 40 as a safety measure.

Next with the tailgate of the truck 32 fully open, the bridging pieces 16 are installed. The bridging pieces 16 are installed by hooking the pair of semi-circular brackets 58 around the ramp support bar 30 and then resting the other ends of the bridging pieces 16 on the bottom of the bed of the truck 32. Each bridging piece 16 is positioned in alignment with a respective ramp 14 such that, the bridging piece in cooperation with the respective ramp 14 forms a continuous path between the ground and the bed of the truck 32, and the brackets 58 thereof are positioned on either side of a respective pair of rings 50. The ATV can now be safely driven on to or off of the bed of the truck 32 without putting stress on the tailgate of the truck.

It is to be understood that the present invention is not limited to the sole embodiment described above, but encompasses any and all embodiments within the scope of the following claims.

I claim:

1. A ramp system for loading and unloading a vehicle having a cargo area and being equipped with a trailer hitch receiver, said ramp system comprising:

a ramp support securable to the trailer hitch receiver, said ramp support including
a substantially L-shaped support frame, and
an extension attached to said L-shaped support frame, said extension vertically adjustable with respect to said L-shaped support frame; and at least one ramp engageable with said ramp support, said at least one ramp having a first end and a second end, said at least one ramp forming an inclined support when engaged to said ramp support with said first end thereof resting on a supporting ground surface.

2. The ramp system according to claim 1, wherein said substantially L-shaped support frame includes:

a first limb perpendicular to a second limb, said first limb securable to the trailer hitch receiver, said second limb having at least one through hole therein.

3. The ramp system according to claim 2, wherein said ramp support includes:

a ramp support bar having a middle, said extension attached to said ramp support bar at about said middle of said ramp support bar and extending perpendicularly from said ramp support bar, said extension telescopingly receiving said second limb of said L-shaped support frame, said extension having a plurality of holes therethrough; and at least one bolt passing through one of said plurality of holes and said through hole of said second limb.

4. The ramp system according to claim 3, wherein said Lshaped support frame includes:

a first member forming said first limb, said first member having a first end and a second end, said first end of said first member being dimensioned and configured to be receivable within the trailer hitch receiver; and a second member forming said second limb, said second member having a first end and a second end, said first end of said second member being attached to said second end of said first member such that said second member is perpendicular to said first member, said second member having a pair of through holes distributed along said second member.

5. The ramp system according to claim 4, wherein said extension includes:

a pair of flat substantially rectangular bars attached at about said middle of said ramp support bar and extending perpendicularly from said ramp support bar, said pair of flat substantially rectangular bars being spaced apart from one another for a distance sufficient to allow said second member to fit therebetween, each of said pair of flat substantially rectangular bars having a first plurality of holes and a second plurality of holes therethrough, respectively, each of said first plurality of holes being in registry with a respective one of said second plurality of holes.

6. The ramp system according to claim 5, wherein said at least one ramp includes:

a first beam having a first end and a second end;
a second beam having a first end and a second end, said second beam being parallel to said first beam;
a plurality of rungs extending perpendicularly between said first beam and said second beam; and
a pair of rings, each of said pair of rings being attached to said second end of a respective one of said first beam and said second beam such that said pair of rings are in registry with one another, said at least one ramp being engageable to said ramp support bar by slipping said pair of rings around said ramp support bar.

7. The ramp system according to claim 6, wherein said at least one ramp has a top side over which loads are moved and a bottom side, and each of said plurality of rungs is formed by two flat elongated portions which come together at an angle along their lengths to form an apical ridge and each of said plurality of rungs is positioned such that said apical ridge faces toward said bottom side to thereby provide for increased traction on said top side, said at least one ramp further including a pair of stiffening ribs each being attached along a portion of a respective one of said first beam and said second beam on said bottom side.

8. The ramp system according to claim 7, wherein one of said pair of rings has a threaded hole, said ramp system further including a screw engaging said threaded hole, whereby said screw can frictionally engage said ramp support bar to secure said at least one ramp in place.

9. The ramp system according to claim 8, wherein said ramp support bar has a first end and a second end, said first end of said ramp support bar has a first retaining pin hole therethrough, and said second end of said ramp support bar has a second retaining pin hole therethrough, said ramp system further including a first retaining pin engageable with said first retaining pin hole and a second retaining pin engageable with said second retaining pin hole, whereby said pair of rings are prevented from slipping off of said ramp support bar when said first retaining pin is engaged with said first retaining pin hole and said second retaining pin is engaged with said second retaining pin hole.

10. The ramp system according to claim 9, further including at least one bridging piece, said bridging piece being engageable between said ramp support and the cargo area, whereby said bridging piece forms a bridging support to facilitate movement of a load between said ramp support and the cargo area.

11. The ramp system according to claim 10, wherein said least one bridging piece includes:

a first lateral member having a first end and a second end;

a second lateral member having a first end and a second end, said second lateral member being parallel to said first lateral member;

a plurality of bridging piece rungs extending perpendicularly between said first lateral member and said second lateral member; and a pair of semi-circular brackets, each of said pair of semicircular brackets being attached to said second end of a respective one of said first lateral member and said second lateral member such that said pair of semi-circular brackets are in registry with one another, said at least one bridging piece being engageable to said ramp support bar by hooking said pair of semi-circular brackets over said ramp support bar while resting said first ends of said first and second lateral members on the cargo area.

12. The ramp system according to claim 11, wherein said at least one ramp is a pair of ramps and said at least one bridging piece is a pair of bridging pieces.

13. A ramp system for loading and unloading a vehicle having a cargo area and being equipped with a trailer hitch receiver, said ramp system comprising:

a ramp support securable to the trailer hitch receiver;

at least one ramp engageable with said ramp support, said at least one ramp having a first end and a second end, said at least one ramp forming an inclined support when engaged to said ramp support with said first end thereof resting on a supporting ground surface; and at least one bridging piece, said bridging piece being engageable between said ramp support and the cargo area, whereby said bridging piece forms a bridging support to facilitate movement of a load between said ramp support and the cargo area.

14. A ramp support for supporting a loading ramp proximate a cargo area of a vehicle equipped with a trailer hitch receiver, said ramp support comprising:

a first member having a first end and a second end, said first end of said first member being dimensioned and configured to be receivable within the trailer hitch receiver;

a second member having a first end and a second end, said first end of said second member being attached to said second end of said first member such that said second member is perpendicular to said first member, said second member having a pair of through holes distributed along said second member;

a ramp support bar having a middle;

a pair of flat substantially rectangular bars attached at about said middle of said ramp support bar and extending perpendicularly from said ramp support bar, said pair of flat substantially rectangular bars being spaced apart from one another for a distance sufficient to allow said second member to fit therebetween, each of said pair of flat substantially rectangular bars having a first plurality of holes and a second plurality of holes therethrough, respectively, each of said first plurality of holes being in registry with a respective one of said second plurality of holes; and a pair of bolts, each of said pair of bolts passing through a user selected one of said first plurality of holes, a respective one of said pair of through holes, and a respective one of said second plurality of holes, whereby said ramp support bar is adjustably fixed at a user selected distance relative to said first member.

15. The ramp support according to claim 14, wherein said first member has a third plurality of holes provided along its length, whereby said second member can be adjustably fixed at a user selected horizontal distance relative to the trailer hitch receiver.

* * * * *